US009876231B2

(12) United States Patent
Murase et al.

(10) Patent No.: US 9,876,231 B2
(45) Date of Patent: Jan. 23, 2018

(54) BINDER COMPOSITION FOR POSITIVE ELECTRODE OF LITHIUM ION SECONDARY BATTERY, SLURRY COMPOSITION FOR POSITIVE ELECTRODE OF LITHIUM ION SECONDARY BATTERY AND METHOD OF PRODUCING THE SAME, METHOD OF PRODUCING POSITIVE ELECTRODE FOR LITHIUM ION SECONDARY BATTERY, AND LITHIUM ION SECONDARY BATTERY

(71) Applicant: ZEON CORPORATION, Chiyoda-ku, Tokyo (JP)

(72) Inventors: Tomoya Murase, Tokyo (JP); Takumi Sugimoto, Tokyo (JP); Ikuya Mesuda, Tokyo (JP)

(73) Assignee: ZEON CORPORATION, Chiyoda-ku, Tokyo ( * ) Notice: Subject to any disclaimer, the term of this patent is extended or adjusted under 35 U.S.C. 154(b) by 20 days.

(21) Appl. No.: 14/890,664

(22) PCT Filed: May 14, 2014

(86) PCT No.: PCT/JP2014/002554

§ 371 (c)(1),
(2) Date: Nov. 12, 2015

(87) PCT Pub. No.: WO2014/185072

PCT Pub. Date: Nov. 20, 2014

(65) Prior Publication Data

US 2016/0126553 A1 May 5, 2016

(30) Foreign Application Priority Data

May 15, 2013 (JP) ................................ 2013-103199

(51) Int. Cl.

| | |
|---|---|
| ***H01M 4/62*** | (2006.01) |
| ***H01M 10/0525*** | (2010.01) |
| ***H01M 4/04*** | (2006.01) |
| ***H01M 4/13*** | (2010.01) |
| ***H01M 4/131*** | (2010.01) |
| ***H01M 4/139*** | (2010.01) |
| ***C09J 133/08*** | (2006.01) |
| ***H01M 4/525*** | (2010.01) |
| *H01M 10/052* | (2010.01) |
| *H01M 4/505* | (2010.01) |
| *C08K 3/22* | (2006.01) |

(52) U.S. Cl.
CPC ........... *H01M 4/622* (2013.01); *C09J 133/08* (2013.01); *H01M 4/0404* (2013.01); *H01M 4/13* (2013.01); *H01M 4/131* (2013.01); *H01M 4/139* (2013.01); *H01M 4/525* (2013.01); *H01M 10/0525* (2013.01); *C08K 3/22* (2013.01); *C08K 2003/2203* (2013.01); *H01M 4/505* (2013.01); *H01M 10/052* (2013.01)

(58) Field of Classification Search
CPC ........ H01M 4/13; H01M 4/131; H01M 4/139; H01M 10/0525; H01M 4/0404; H01M 4/525; H01M 4/622; H01M 10/052; H01M 4/505; C09J 133/08; C08K 3/22; C08K 2003/2203
See application file for complete search history.

(56) References Cited

U.S. PATENT DOCUMENTS

2008/0187838 A1 8/2008 Le
2014/0212728 A1* 7/2014 Kaneda ................ H01M 2/162 429/144
2014/0335410 A1* 11/2014 Loveridge ............ H01M 4/622 429/217

FOREIGN PATENT DOCUMENTS

| | | | |
|---|---|---|---|
| CN | 101663782 | A | 3/2010 |
| JP | 4438104 | B | 3/2010 |
| JP | 4904709 | B | 3/2012 |
| WO | 2012101450 | A1 | 8/2012 |

OTHER PUBLICATIONS

Nov. 17, 2015, International Preliminary Report on Patentability issued in the International Patent Application No. PCT/JP2014/002554.

* cited by examiner

*Primary Examiner* — Muhammad S Siddiquee
(74) *Attorney, Agent, or Firm* — Kenja IP Law PC

(57) ABSTRACT

The disclosed binder composition for the positive electrode of a lithium ion secondary battery includes a binder and an organic dispersion medium, a weight-average molecular weight of the binder being from 100,000 to 2,000,000, and the binder containing 10% to 35% by mass of an ethylenically unsaturated monomer unit containing an acid group, and includes 0.6 to 1.5 equivalents of lithium with respect to the acid group. The disclosed slurry composition for the positive electrode of a lithium ion secondary battery includes this binder composition, a positive electrode active material, and a conductive material.

11 Claims, No Drawings

BINDER COMPOSITION FOR POSITIVE ELECTRODE OF LITHIUM ION SECONDARY BATTERY, SLURRY COMPOSITION FOR POSITIVE ELECTRODE OF LITHIUM ION SECONDARY BATTERY AND METHOD OF PRODUCING THE SAME, METHOD OF PRODUCING POSITIVE ELECTRODE FOR LITHIUM ION SECONDARY BATTERY, AND LITHIUM ION SECONDARY BATTERY

TECHNICAL FIELD

This disclosure relates to a binder composition for the positive electrode of a lithium ion secondary battery, a slurry composition for the positive electrode of a lithium ion secondary battery, a method of producing a slurry composition for the positive electrode of a lithium ion secondary battery, a method of producing a positive electrode for a lithium ion secondary battery, and a lithium ion secondary battery.

BACKGROUND

Lithium ion secondary batteries, which have characteristics such as compact size, light weight, high energy-density, and rechargeability, are used in a wide variety of applications. Therefore, to increase the performance of lithium ion secondary batteries even further, improvements in battery members such as electrodes have been considered in recent years.

A positive electrode for a lithium ion secondary battery generally includes a current collector and an electrode mixed material layer (positive electrode mixed material layer) formed on the current collector. This positive electrode mixed material layer is, for example, formed by applying a slurry composition onto the current collector and drying the slurry composition. The slurry composition is, for example, formed by dispersing a positive electrode active material, conductive material, binder, and the like in a dispersion medium.

Conventionally, polyvinylidene fluoride (PVDF), a copolymer containing an acid functionality-containing monomer unit, or the like has been used as the binder blended into the slurry composition used to form the positive electrode mixed material layer (for example, see JP 4438104 B2 (PTL 1) and JP 4904709 B2 (PTL 2)). An organic dispersion medium such as N-methylpyrrolidone is used as the dispersion medium that is used to prepare the slurry composition.

CITATION LIST

Patent Literature

PTL 1: JP 4438104 B2
PTL 2: JP 4904709 B2

SUMMARY

Technical Problem

To prepare a positive electrode with a well-formed positive electrode mixed material layer in order to obtain a lithium ion secondary battery with excellent electrical characteristics, there is demand for a slurry composition with excellent dispersibility of blending materials such as the binder.

In a slurry composition using the above conventional binder, however, the occurrence of aggregations and gel and a decrease in the dispersibility of blending materials are problematic. Furthermore, with a positive electrode prepared using a slurry composition having low dispersibility, it has not been possible to sufficiently improve the electrical characteristics of the lithium ion secondary battery.

The aggregations and gel in the slurry composition particularly occur easily when using a positive electrode active material that includes nickel (Ni) and manganese (Mn) in order to obtain a lithium ion secondary battery with a high capacity.

It would therefore be helpful to provide a binder composition for the positive electrode of a lithium ion secondary battery that can suppress the occurrence of aggregations and gel, a slurry composition for the positive electrode of a lithium ion secondary battery that has excellent dispersibility and can sufficiently improve the electrical characteristics of the lithium ion secondary battery, and a method of producing this slurry composition.

It would also be helpful to provide a method of producing a positive electrode for a lithium ion secondary battery that can sufficiently improve the electrical characteristics of the lithium ion secondary battery, and a lithium ion secondary battery with excellent electrical characteristics.

Solution to Problem

Extensive studies revealed that the occurrence of aggregations and gel is suppressed, and good dispersibility is obtained, with a slurry composition for the positive electrode of a lithium ion secondary battery prepared using a binder composition for the positive electrode of a lithium ion secondary battery such that the binder composition includes (i) a binder having a predetermined weight-average molecular weight and containing a predetermined amount of an ethylenically unsaturated monomer unit containing an acid group and (ii) a predetermined amount of lithium.

In order to solve the above problem advantageously, the disclosed binder composition for the positive electrode of a lithium ion secondary battery includes: a binder and an organic dispersion medium, wherein a weight-average molecular weight of the binder is from 100,000 to 2,000,000, and wherein the binder contains 10% to 35% by mass of an ethylenically unsaturated monomer unit containing an acid group; and 0.6 to 1.5 equivalents of lithium with respect to the acid group.

The disclosed slurry composition for the positive electrode of a lithium ion secondary battery includes the above-mentioned binder composition for the positive electrode of a lithium ion secondary battery, a positive electrode active material, and a conductive material.

By using a binder composition for the positive electrode of a lithium ion secondary battery such that the binder has a predetermined weight-average molecular weight and contains a predetermined amount of ethylenically unsaturated monomer unit containing an acid group and such that the binder composition contains a predetermined amount of lithium with respect to the acid group, the occurrence of aggregations and gel can be suppressed, and a slurry composition for the positive electrode of a lithium ion secondary battery with excellent dispersibility can be obtained. By using a positive electrode for a lithium ion secondary battery prepared with this slurry composition for the positive electrode of a lithium ion secondary battery, the electrical characteristics of the lithium ion secondary battery can be sufficiently improved.

In the disclosed slurry composition for the positive electrode of a lithium ion secondary battery, a TI value (ratio of viscosity at 6 rpm to viscosity at 60 rpm) measured with a Brookfield viscometer is preferably from 1 to 4. If the TI value of the slurry composition for the positive electrode of a lithium ion secondary battery is from 1 to 4, the slurry composition for the positive electrode of a lithium ion secondary battery can be applied well to the substrate of a current collector or the like, thereby forming a uniform positive electrode mixed material layer. Accordingly, by using this slurry composition for the positive electrode of a lithium ion secondary battery, it is possible to prepare a positive electrode for a lithium ion secondary battery having a uniform positive electrode mixed material layer and to further improve the electrical characteristics of the lithium ion secondary battery.

In the disclosed slurry composition for the positive electrode of a lithium ion secondary battery, the binder preferably contains 50% to 85% by mass of a (meth)acrylate monomer unit. Setting the content of the (meth)acrylate monomer unit to be 50% to 85% by mass yields a slurry composition for the positive electrode of a lithium ion secondary battery with excellent coatability and allows improvement in the flexibility of the positive electrode for a lithium ion secondary battery prepared using this slurry composition for the positive electrode of a lithium ion secondary battery.

Furthermore, in the disclosed slurry composition for the positive electrode of a lithium ion secondary battery, the acid group preferably includes at least one of a carboxylic acid group and a sulfonate group. When the acid group includes at least one of a carboxylic acid group and a sulfonate group, the dispersibility of the slurry composition for the positive electrode of a lithium ion secondary battery can be further improved.

In the disclosed slurry composition for the positive electrode of a lithium ion secondary battery, a degree of swelling in electrolysis solution of the binder is preferably 1 to 5 times. When the degree of swelling in electrolysis solution is 1 to 5 times, the peel strength of a positive electrode for a lithium ion secondary battery prepared using the slurry composition for the positive electrode of a lithium ion secondary battery can be sufficiently guaranteed, thereby suppressing degradation of the cycle characteristics.

In the disclosed slurry composition for the positive electrode of a lithium ion secondary battery, the positive electrode active material is preferably a lithium nickel composite oxide. In the disclosed slurry composition for the positive electrode of a lithium ion secondary battery, the occurrence of aggregations and gel is sufficiently suppressed even when using a lithium nickel composite oxide as the positive electrode active material. Therefore, a sufficient increase in capacity can be achieved in a lithium ion secondary battery that uses a positive electrode for a lithium ion secondary battery in which a lithium nickel composite oxide is used as the positive electrode active material.

As used in this disclosure, a "lithium nickel composite oxide" refers to a lithium-containing composite oxide that includes nickel, such as a lithium-containing composite oxide of Co—Ni—Mn, a lithium-containing composite oxide of Ni—Mn—Al, a lithium-containing composite oxide of Ni—Co—Al, or the like.

In order to solve the above problem advantageously, the disclosed method of producing a slurry composition for the positive electrode of a lithium ion secondary battery includes: preparing a binder composition for the positive electrode of a lithium ion secondary battery, the binder composition including a binder and an organic dispersion medium; and mixing the binder composition for the positive electrode of a lithium ion secondary battery, a positive electrode active material, and a conductive material, wherein preparing the binder composition for the positive electrode of a lithium ion secondary battery includes: polymerizing a monomer composition to obtain a water dispersion of a polymer; adding a lithium compound to the water dispersion and adjusting pH to 7.5 or greater to obtain a pH adjusted water dispersion including a polymer that has a weight-average molecular weight of 100,000 to 2,000,000 and contains 10% to 35% by mass of an ethylenically unsaturated monomer unit containing an acid group and including 0.6 to 1.5 equivalents of lithium with respect to the acid group; and substituting an organic dispersion medium for water in the pH adjusted water dispersion. This method allows suppression of the occurrence of aggregations and gel and yields a slurry composition for the positive electrode of a lithium ion secondary battery with excellent dispersibility.

In order to solve the above problem advantageously, the disclosed method of producing a positive electrode for a lithium ion secondary battery includes forming a positive electrode mixed material layer on a current collector by applying the above-mentioned slurry composition for the positive electrode of a lithium ion secondary battery on the current collector and drying the slurry composition. By thus forming a positive electrode mixed material layer using the above-described slurry composition for the positive electrode of a lithium ion secondary battery, a positive electrode for a lithium ion secondary battery that allows sufficient improvement in the electrical characteristics of a lithium ion secondary battery can be obtained.

In order to solve the above problem advantageously, the disclosed lithium ion secondary battery includes a positive electrode for a lithium ion secondary battery obtained by the above-mentioned method of producing a positive electrode, a negative electrode, an electrolysis solution, and a separator. By thus using a positive electrode for a lithium ion secondary battery obtained by the above-mentioned method, a lithium ion secondary battery with excellent electrical characteristics can be obtained.

Advantageous Effect

This disclosure provides a binder composition for the positive electrode of a lithium ion secondary battery that can suppress the occurrence of aggregations and gel and a slurry composition for the positive electrode of a lithium ion secondary battery that has excellent dispersibility and can sufficiently improve the electrical characteristics of the lithium ion secondary battery. Furthermore, this disclosure provides a method of producing a positive electrode for a lithium ion secondary battery that can sufficiently improve the electrical characteristics of the lithium ion secondary battery. This disclosure also provides a lithium ion secondary battery with excellent electrical characteristics.

DETAILED DESCRIPTION

The following describes embodiments in detail.

The disclosed binder composition for the positive electrode of a lithium ion secondary battery may be used to prepare a slurry composition for the positive electrode of a lithium ion secondary battery. The disclosed slurry composition for the positive electrode of a lithium ion secondary battery may, for example, be produced using the disclosed method of producing a slurry composition for the positive electrode of a lithium ion secondary battery and is used when forming the positive electrode for a lithium ion secondary battery. The disclosed method of producing a positive electrode for a lithium ion secondary battery produces a positive electrode for a lithium ion secondary battery by using the disclosed slurry composition for the positive electrode of a lithium ion secondary battery. The disclosed lithium ion secondary battery uses the positive electrode for a lithium ion secondary battery obtained with the disclosed method of producing a positive electrode for a lithium ion secondary battery.

(Binder Composition for the Positive Electrode of a Lithium Ion Secondary Battery)

The disclosed binder composition for the positive electrode of a lithium ion secondary battery includes a binder and an organic dispersion medium. The disclosed binder composition for the positive electrode of a lithium ion secondary battery uses, as the binder, a polymer having a weight-average molecular weight of 100,000 to 2,000,000 and the containing 10% to 35% by mass of an ethylenically unsaturated monomer unit containing an acid group, and contains 0.6 to 1.5 equivalents of lithium with respect to the acid group.

As used in this disclosure, the "weight-average molecular weight" refers to the weight-average molecular weight, in terms of polystyrene, that is measured by gel permeation chromatography (GPC). As used in this disclosure, the phrase "contains a monomer unit" means that "a polymer obtained with the monomer contains a structural unit derived from the monomer".

<Binder>

In a positive electrode produced by forming a positive electrode mixed material layer on a current collector using a slurry composition for the positive electrode of a lithium ion secondary battery that includes the disclosed binder composition for the positive electrode of a lithium ion secondary battery, the binder is a component that can hold the components included in the positive electrode mixed material layer to prevent separation of these components from the positive electrode mixed material layer. When immersed in an electrolysis solution, the binder in the positive electrode mixed material layer generally absorbs the electrolysis solution and swells while binding the positive electrode active materials to each other, binding the positive electrode active material to the conductive material, or binding the conductive materials to each other to prevent the positive electrode active material and the like from coming off the current collector.

The binder used in the disclosed binder composition for the positive electrode of a lithium ion secondary battery is formed by a polymer that can dissolve or disperse in an organic solvent that acts as an organic dispersion medium. Examples of the organic solvent include N-methylpyrrolidone and the like. One kind of polymer may be used alone, or two or more kinds may be used in combination.

The weight-average molecular weight of the binder used in the disclosed binder composition for the positive electrode of a lithium ion secondary battery needs to be 100,000 or greater to 2,000,000 or less and is preferably 250,000 or greater, more preferably 500,000 or greater, and particularly preferably 700,000 or greater, but is preferably 1,750,000 or less, more preferably 1,500,000 or less, and particularly preferably 1,300,000 or less. If the weight-average molecular weight of the binder is less than 100,000, the dispersibility of the slurry composition for the positive electrode of a lithium ion secondary battery prepared using the binder composition for the positive electrode of a lithium ion secondary battery degrades, and the binding capacity also degrades. This results in degradation of the electrical characteristics, such as the cycle characteristics, of the lithium ion secondary battery produced using the slurry composition for the positive electrode of a lithium ion secondary battery. If the weight-average molecular weight exceeds 2,000,000, then cross-link formation and the like lead to a degradation in the dispersibility of the slurry composition for the positive electrode of a lithium ion secondary battery prepared using the binder composition for the positive electrode of a lithium ion secondary battery, and uniformity of the electrode mixed material layer prepared using the slurry composition for the positive electrode of a lithium ion secondary battery degrades. This results in degradation of the electrical characteristics, such as the initial capacity and the rate characteristics, of the lithium ion secondary battery produced using the slurry composition for the positive electrode of a lithium ion secondary battery.

In the polymer used as the binder, the content percentage of the ethylenically unsaturated monomer unit containing an acid group needs to be 10% by mass or greater to 35% by mass or less and is preferably 15% by mass or greater, but is preferably 30% by mass or less and more preferably 20% by mass or less. If the content percentage of the ethylenically unsaturated monomer unit containing an acid group is less than 10% by mass or greater than 35% by mass, aggregations occur in the slurry composition for the positive electrode of a lithium ion secondary battery prepared using the binder composition for the positive electrode of a lithium ion secondary battery, and the dispersibility of the slurry composition for the positive electrode of a lithium ion secondary battery degrades.

A portion or all of the acid group included in the polymer normally forms a salt with the below-described lithium.

The monomer that can form the ethylenically unsaturated monomer unit containing an acid group may be any ethylenically unsaturated monomer that contains an acid group such as a carboxylic acid group, a sulfonate group, a phosphate group, a maleimide group, or the like.

Specifically, examples of the ethylenically unsaturated monomer containing a carboxylic acid group as the acid group include an unsaturated monocarboxylic acid such as acrylic acid, methacrylic acid, crotonic acid, and the like; an ethylenically unsaturated dicarboxylic acid such as maleic acid, fumaric acid, itaconic acid, and the like; and a partial ester compound of an ethylenically unsaturated polyvalent carboxylic acid such as monomethyl maleate, monoethyl itaconate, and the like.

Examples of the ethylenically unsaturated monomer containing a sulfonate group as the acid group include ethylenically unsaturated sulfonic acid such as vinyl sulfonic acid, styrene sulfonic acid, allyl sulfonic acid, and methallyl sulfonic acid; 2-acrylamide-2-methylpropane sulfonic acid, sulfobis-(3-sulfopropyl)itaconic acid ester, and the like.

Furthermore, examples of the ethylenically unsaturated monomer containing a phosphate group as the acid group include vinyl phosphonic acid, vinyl phosphate, bis(methacryloxyethyl)phosphate, diphenyl-2-methacryloyloxyethylphosphate-3-allyloxy-2-hydroxypropane phosphoric acid, and the like.

Examples of the ethylenically unsaturated monomer containing a maleimide group as the acid group include N-vinylmaleinimide, N-(4-vinylphenyl)maleinimide, and the like.

To improve the dispersibility of the slurry composition for the positive electrode of a lithium ion secondary battery obtained using the binder composition for the positive electrode of a lithium ion secondary battery, the ethylenically unsaturated monomer that contains an acid group is preferably an ethylenically unsaturated monomer containing a carboxylic acid group and an ethylenically unsaturated monomer containing a sulfonate group, more preferably methacrylic acid, acrylic acid, itaconic acid, and 2-acrylamide-2-methylpropane sulfonic acid, and particularly preferably methacrylic acid and 2-acrylamide-2-methylpropane sulfonic acid.

One kind of the above-described ethylenically unsaturated monomers that contain an acid group may be used alone, or two or more kinds may be used in combination.

To improve the electrical characteristics of the lithium ion secondary battery produced using the slurry composition for the positive electrode of a lithium ion secondary battery, the dispersibility of which has been increased by being prepared with the binder composition for the positive electrode of a lithium ion secondary battery, an ethylenically unsaturated monomer containing a carboxylic acid group such as methacrylic acid is preferably used alone, or a combination of an ethylenically unsaturated monomer containing a carboxylic acid group such as methacrylic acid and an ethylenically unsaturated monomer containing a sulfonate group such as 2-acrylamide-2-methylpropane sulfonic acid is preferably used as the ethylenically unsaturated monomer that contains an acid group. When using an ethylenically unsaturated monomer containing a carboxylic acid group and an ethylenically unsaturated monomer containing a sulfonate group in combination, then in the polymer used as the binder, the percentage of the amount of the ethylenically unsaturated monomer unit containing a sulfonate group within the total amount of the ethylenically unsaturated monomer unit containing a carboxylic acid group and the ethylenically unsaturated monomer unit containing a sulfonate group is preferably 20% by mass or less, more preferably 15% by mass or less, and particularly preferably 10% by mass or less.

As the binder in the disclosed binder composition for the positive electrode of a lithium ion secondary battery, any polymer having the above-described weight-average molecular weight and including an ethylenically unsaturated monomer unit containing an acid group may be used, such as a diene polymer, acrylic polymer, fluoropolymer, silicone polymer, or the like. Among these polymers, an acrylic polymer is preferred for its superior oxidation resistance.

Here, the acrylic polymer used as the binder is a polymer containing a (meth)acrylate monomer unit. Among such polymers, a polymer containing a (meth)acrylate monomer unit and further containing an α,β-unsaturated nitrile monomer unit is preferable. The acrylic polymer containing the above monomer units further improves the flexibility and binding capacity of the binder.

As used herein, the term "(meth)acrylic" refers to acrylic and/or methacrylic.

Examples of the (meth)acrylate monomer that can be used to produce the acrylic polymer include acrylic acid alkyl esters, such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these, monomers having an alkyl group, which bonds with noncarbonylic oxygen atoms, with a carbon number of 4 to 13 are preferable, n-butyl acrylate and 2-ethylhexyl acrylate are more preferable, and 2-ethylhexyl acrylate is particularly preferable. This is because, when used in a positive electrode of a lithium ion secondary battery, the polymer obtained with those monomers moderately swells in the electrolysis solution, without being eluted into the electrolysis solution, to exhibit good ion conductivity and extend the battery life. These monomers may be used alone or in combination of at least two thereof.

The content percentage of the (meth)acrylate monomer unit in the acrylic polymer that is used as the polymer is preferably 50% by mass or greater, more preferably 55% by mass or greater, even more preferably 60% by mass or greater, and particularly preferably 65% by mass or greater, but is preferably 85% by mass or less, more preferably 80% by mass or less, even more preferably 75% by mass or less, and particularly preferably 70% by mass or less. By setting the content percentage of the monomer unit derived from a (meth)acrylate monomer to be 50% by mass or greater, the flexibility of the polymer can be increased, which makes the positive electrode for a lithium ion secondary battery obtained using the slurry composition for the positive electrode of a lithium ion secondary battery prepared using the binder composition for the positive electrode of a lithium ion secondary battery less likely to crack. By setting the content percentage to be 85% by mass or less, the mechanical strength and binding capacity of the polymer can be improved, the slurry composition for the positive electrode of a lithium ion secondary battery prepared using the binder composition for the positive electrode of a lithium ion secondary battery can be endowed with good coatability, and the electrical characteristics, such as the initial capacity and the rate characteristics, of the lithium ion secondary battery produced using the slurry composition for the positive electrode of a lithium ion secondary battery can be improved.

Examples of the α,β-unsaturated nitrile monomer include acrylonitrile, methacrylonitrile, α-chloro acrylonitrile, α-ethyl acrylonitrile, and the like. To improve mechanical strength and binding capacity, among these monomers acrylonitrile and methacrylonitrile are preferred, and acrylonitrile is particularly preferred. One kind of these may be used alone, or two or more kinds may be used in combination.

The content percentage of α,β-unsaturated nitrile monomer unit in the acrylic polymer used as the binder is preferably 5% by mass or greater, more preferably 10% by mass or greater, and even more preferably 14% by mass or greater; but preferably 30% by mass or less, more preferably 25% by mass or less, even more preferably 20% by mass or less, and particularly preferably 17% by mass or less. By setting the content percentage of the α,β-unsaturated nitrile monomer unit to 5% by mass or greater, the mechanical strength of the polymer can be improved, and the adherence between the positive electrode active material and the current collector and between the positive electrode active materials can be increased. As a result, the electrical characteristics, such as the cycle characteristics, can be guaranteed in the lithium ion secondary battery produced using the slurry composition for the positive electrode of a lithium ion secondary battery prepared using the binder composition for the positive electrode of a lithium ion secondary battery. Furthermore, by setting the content percentage to 30% by mass or less, the degree of swelling of the binder in electrolysis solution can be set to an appropriate value, and the electrical characteristics, such as the cycle characteristics, can be guaranteed in the lithium ion secondary battery produced using the slurry composition for the positive electrode of a lithium ion secondary battery prepared using the binder composition for the positive electrode of a lithium ion secondary battery.

The acrylic polymer suitably used as the binder may contain a cross-linkable monomer unit in addition to the above-described monomer units.

Examples of the cross-linkable monomer include an epoxy group-containing monomer, a monomer containing a carbon-carbon double bond and an epoxy group, a monomer containing a halogen atom and an epoxy group, N-methylol amide group-containing monomer, oxetanyl group-containing monomer, oxazoline group-containing monomer, and a multifunctional monomer having two or more olefinic double bonds.

The content percentage of the cross-linkable monomer unit in the acrylic polymer is preferably greater than 0% by mass but preferably 10% by mass or less and more preferably 5% by mass or less.

The acrylic polymer may further contain a monomer unit derived from monomers other than the above-described monomers. Examples of such a monomer unit include a polymer unit derived from a vinyl monomer and a hydroxy group-containing monomer unit.

Examples of the vinyl monomer include carboxylic acid esters having two or more carbon-carbon double bonds, such as ethylene glycol dimethacrylate and diethylene glycol dimethacrylate; halogen atom-containing monomers, such as vinyl chloride and vinylidene chloride; vinyl esters, such as vinyl acetate, vinyl propionate, and vinyl butyrate; vinyl ethers, such as methyl vinyl ether, ethyl vinyl ether, and butyl vinyl ether; vinyl ketones, such as methyl vinyl ketone, ethyl vinyl ketone, butyl vinyl ketone, hexyl vinyl ketone, and isopropenyl vinyl ketone; and heterocycle-containing vinyl compounds, such as N-vinylpyrrolidone, vinylpyridine, and vinylimidazole.

Examples of the hydroxy group-containing monomer include ethylenically unsaturated alcohol, such as (meth)allyl alcohol, 3-butene-1-ol, and 5-hexene-1-ol; alkanol esters of ethylenically unsaturated carboxylic acid, such as 2-hydroxyethyl-acrylate, 2-hydroxypropyl-acrylate, 2-hydroxyethyl-methacrylate, 2-hydroxypropyl-methacrylate, di-2-hydroxyethyl-maleate, di-4-hydroxybutyl maleate, and di-2-hydroxypropyl itaconate; esters of (meth)acrylic acid and polyalkylene glycol represented by the general formula $CH_2{=}CR^1{-}COO{-}(C_nH_{2n-1}O)_m{-}H$ (where m represents an integer from 2 to 9, n represents an integer from 2 to 4, and $R^1$ represents hydrogen or a methyl group); mono(meth)acrylates of dihydroxy ester of dicarboxylic acid, such as 2-hydroxyethyl-2'-(meth)acryloyl oxyphthalate and 2-hydroxyethyl-2'-(meth)acryloyl oxysuccinate; vinyl ethers, such as 2-hydroxyethyl vinyl ether and 2-hydroxypropyl vinyl ether; mono(meth)allyl ethers of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol(meth)monoallyl ethers, such as diethylene glycol mono(meth)allyl ether and dipropylene glycol mono(meth)allyl ether; glycerin mono (meth)allyl ether; mono(meth)allyl ether of halogen or hydroxy substitution of (poly)alkylene glycol, such as (meth)allyl-2-chloro-3-hydroxypropyl ether and (meth)allyl-2-hydroxy-3-chloropropyl ether; mono(meth)allyl ether of polyhydric phenol, such as eugenol and isoeugenol, and a halogen substitution thereof; and (meth)allyl thioethers of alkylene glycol, such as (meth)allyl-2-hydroxyethyl thioether and (meth)allyl-2-hydroxypropyl thio ether.

The term "(meth)allyl" as used in this disclosure refers to allyl and/or methallyl, and the term "(meth)acryloyl" refers to acryloyl and/or methacryloyl.

One kind of these may be used alone, or two or more kinds may be used in combination.

The content percentage of the polymer unit derived from a vinyl monomer or the hydroxy group-containing monomer unit in the acrylic polymer is preferably greater than 0% by mass but preferably 10% by mass or less and more preferably 5% by mass or less.

Here, the polymer that may be used as the binder, such as the above-described acrylic polymer and the like, preferably has a degree of swelling in electrolysis solution of 1 to 5 times, more preferably 4 times or less, even more preferably 3 times or less, and particularly preferably 2 times or less. If the degree of swelling in electrolysis solution is 1 time or greater, then when a positive electrode for a lithium ion secondary battery prepared using the slurry composition for the positive electrode of a lithium ion secondary battery that includes the binder composition for the positive electrode of a lithium ion secondary battery is used in a lithium ion secondary battery, dissolution of the polymer in the electrolysis solution can be suppressed, and degradation of the peel strength of the positive electrode and of the cycle characteristics of the lithium ion secondary battery can be suppressed. Furthermore, if the degree of swelling in electrolysis solution is 5 times or less, the degree of swelling of the binder in electrolysis solution can be set to an appropriate value, and the electrical characteristics, such as the cycle characteristics, can be guaranteed in the lithium ion secondary battery produced using the slurry composition for the positive electrode of a lithium ion secondary battery that includes the binder composition for the positive electrode of a lithium ion secondary battery. The degree of swelling can be adjusted by changing the preparation conditions of the polymer (such as the monomer that is used, the polymerization conditions, and the like).

The "degree of swelling in electrolysis solution" referred to here can be measured using the measurement method described in the Examples of this disclosure.

The glass-transition temperature (Tg) of the polymer that can be used as the binder can be appropriately adjusted within a range that guarantees strength and flexibility of the positive electrode for a lithium ion secondary battery produced using the slurry composition for the positive electrode of a lithium ion secondary battery that includes the binder composition for the positive electrode of a lithium ion secondary battery. For example, the glass transition temperature (Tg) may be 50° C. or less, preferably −50° C. to 10° C.

The polymer, such as the above-described acrylic polymer, used as the binder can be produced by any polymerization process, for example, by solution polymerization, suspension polymerization, bulk polymerization, or emulsion polymerization. Of these methods, emulsion polymerization that uses an emulsifier is preferred.

As a polymerization method, an addition polymerization such as an ionic polymerization, radical polymerization, living radical polymerization, or the like may be used. As a polymerization initiator, any known polymerization initiator may be used, such as those disclosed in JP 2012-184201 A.

The above-described polymer is usually produced in the form of a dispersion liquid in which the polymer is dispersed in an aqueous medium. Specifically, the polymer is obtained as a water dispersion thereof by polymerizing a monomer composition, into which the above-described monomers have been blended at desired ratios, in water. As described in detail below in the section titled “Method of Producing a Slurry Composition for the Positive Electrode of a Lithium Ion Secondary Battery”, the polymer obtained in the form of a water dispersion is, for example, used by adding a predetermined amount of the below-described lithium compound into the water dispersion and adjusting the pH, after which an organic dispersion medium is substituted for the water to yield a binder composition for the positive electrode of a lithium ion secondary battery. This binder composition is then used to prepare a slurry composition for the positive electrode of a lithium ion secondary battery.

The proportion of each monomeric unit present in the polymer is roughly equivalent to the blending ratio of each monomer.

When preparing a slurry composition for the positive electrode of a lithium ion secondary battery using the binder composition for the positive electrode of a lithium ion secondary battery, the content of the binder (polymer) in the slurry composition for the positive electrode of a lithium ion secondary battery is, in terms of solid content, preferably 0.1 parts by mass or greater and more preferably 0.5 parts by mass or greater; but preferably 10 parts by mass or less, and more preferably 5 parts by mass or less, per 100 parts by mass of the positive electrode active material. By setting the content of the polymer to 0.1 parts by mass or greater per 100 parts by mass of the positive electrode active material, the binding capacity between the positive electrode active materials, between the positive electrode active material and the conductive material, and between the positive electrode active material and the current collector can be increased, which provides good output characteristics and gives a longer battery life to the lithium ion secondary battery that uses the polymer. By setting the content of the polymer to 10 parts by mass or less, the blocking of the migration of the lithium ions by the polymer can be prevented when the positive electrode for a lithium ion secondary battery obtained using the slurry composition for the positive electrode of a lithium ion secondary battery that includes the binder composition for the positive electrode of a lithium ion secondary battery is used in a lithium ion secondary battery, thereby reducing the internal resistance of the lithium ion secondary battery.

<Lithium>

The disclosed binder composition for the positive electrode of a lithium ion secondary battery needs to contain 0.6 or greater to 1.5 or less equivalents of lithium with respect to the above-described acid group contained by the binder, preferably contains 0.7 or greater equivalents of lithium, and more preferably contains 0.8 or greater equivalents of lithium; but preferably contains 1.2 or less equivalents of lithium, and more preferably contains 1.0 or less equivalents of lithium. If the content of lithium with respect to the acid group is less than 0.6 equivalents or greater than 1.5 equivalents, aggregations occur upon preparing a slurry composition for the positive electrode of a lithium ion secondary battery using the binder composition for the positive electrode of a lithium ion secondary battery, and the dispersibility of the slurry composition for the positive electrode of a lithium ion secondary battery degrades. In particular, if the content of lithium with respect to the acid group contained by the binder is greater than 1.5 equivalents, then solubility in an organic dispersion medium of the polymer that is the binder degrades, and aggregations occur in the slurry composition for the positive electrode of a lithium ion secondary battery prepared using the binder composition for the positive electrode of a lithium ion secondary battery.

In this disclosure, an “equivalent” refers to the molar equivalent of lithium necessary to neutralize the acid group in the binder.

The lithium may be provided in a binder composition by adding a lithium compound, such as lithium hydroxide, lithium carbonate, lithium hydrogen carbonate, or the like to the water dispersion of the above-described polymer (binder) and preparing a binder composition for the positive electrode of a lithium ion secondary battery by using the water dispersion to which the lithium compound has been added.

The lithium in the binder composition for the positive electrode of a lithium ion secondary battery is, for example, present in the state of lithium ions, a portion or all of which form a salt with the acid group of the binder.

<Organic Dispersion Medium>

As the organic dispersion medium used in the binder composition for the positive electrode of a lithium ion secondary battery, an organic solvent having polarity that can disperse or dissolve the binder may, for example, be used.

Specifically, as the organic solvent, acetonitrile, N-methylpyrrolidone, acetylpyridine, cyclopentanone, dimethylformamide, dimethyl sulfoxide, methylformamide, methyl ethyl ketone, furfural, ethylenediamine, or the like may be used. Among these organic solvents, N-methylpyrrolidone is most preferable from the perspectives of handleability, safety, ease of synthesis, and the like.

(Slurry Composition for Positive Electrode of Lithium Ion Secondary Battery)

The disclosed slurry composition for the positive electrode of a lithium ion secondary battery is an organic slurry composition having an organic solvent as the dispersion medium and includes the above-described binder composition for the positive electrode of a lithium ion secondary battery, a positive electrode active material, and a conductive material.

<Positive Electrode Active Material>

The positive electrode active material blended in the slurry composition for the positive electrode of a lithium ion secondary battery may be, but not is limited to, any positive electrode active material known in the art. Specific examples of the positive electrode active material include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn, lithium-containing composite oxide of Ni—Mn—Al, lithium-containing composite oxide of Ni—Co—Al, and a solid solution comprising $LiMaO_2$ and $Li_2MbO_3$. Examples of the solid solution comprising $LiMaO_2$ and $Li_2MbO_3$ include $xLiMaO_2.(1-x)Li_2MbO_3$ and the like, where x represents a number satisfying 0<x<1, Ma represents one or more kinds of transition metals with an average oxidation state of 3+, and Mb represents one or more kinds of transition metals with an average oxidation state of 4+.

The term "average oxidation state" as used herein refers to an average oxidation state of the "one or more kinds of transition metals" and is calculated from the molar quantity and the valence of the transition metal. For example, when the "one or more kinds of transition metals" is composed of 50 mol % $Ni^{2+}$ and 50 mol % $Mn^{4+}$, the average oxidation state of the "one or more kinds of transition metals" is calculated as $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, where Mc represents one or more kinds of transition metals having an average oxidation state of 4+, which may be Ni, Co, Fe, Cu, or Cr; t represents a number satisfying 0<t<1; and s represents a number satisfying 0≤s≤1. Another example of the positive electrode active material is lithium-rich spinel compounds represented by the formula $Li_{1+x}Mn_{2-x}O_4$ (0<X<2).

Examples of the lithium-containing composite metal oxide with an olivine structure include olivine-type lithium phosphate compounds represented by the formula $Li_yMdPO_4$, such as olivine-type lithium iron phosphate ($LiFePO_4$) and olivine-type manganese lithium phosphate ($LiMnPO_4$), where Md represents one or more kinds of transition metals having an average oxidation state of 3+, which may be Mn, Fe, or Co, and y represents a number satisfying 0≤y≤2. Md of the olivine-type lithium phosphate compounds represented by the formula $Li_yMdPO_4$ may be partly substituted with another metal. Examples of the metal possibly substituting the part of Md include Cu, Mg, Zn, V, Ca, Sr, Ba, Ti, Al, Si, B, and Mo.

Of the above-described positive electrode active materials, lithium-containing cobalt oxide ($LiCoO_2$) or olivine-type lithium iron phosphate ($LiFePO_4$) is preferred to improve the cycle characteristics and initial capacity of the lithium ion secondary battery including the positive electrode for a lithium ion secondary battery formed with the slurry composition for the positive electrode of a lithium ion secondary battery.

On the other hand, to increase the capacity of the lithium ion secondary battery that includes the positive electrode for a lithium ion secondary battery formed with the slurry composition for the positive electrode of a lithium ion secondary battery, a positive electrode active material containing at least one of Mn and Ni, such as a lithium nickel composite oxide or the like, is preferred. Specifically, to increase the capacity of the lithium ion secondary battery, the positive electrode active material may preferably be $LiNiO_2$, $LiMn_2O_4$, lithium-rich spinel compounds, $LiMnPO_4$, $Li[Ni_{0.5}Co_{0.2}Mn_{0.3}]O_2$, $Li[Ni_{1/3}Co_{1/3}Mn_{1/3}]O_2$, $Li[Ni_{0.17}Li_{0.2}Co_{0.07}Mn_{0.56}]O_2$, $LiNi_{0.5}Mn_{1.5}O_4$, or the like; more preferably be $LiNiO_2$, lithium-rich spinel compounds, $Li[Ni_{0.5}Co_{0.2}Mn_{0.3}]O_2$, $Li[Ni_{1/3}Co_{1/3}Mn_{1/3}]O_2$, $Li[Ni_{0.17}Li_{0.2}Co_{0.07}Mn_{0.56}]O_2$, or the like; and particularly preferably be $Li[Ni_{0.5}Co_{0.2}Mn_{0.3}]O_2$.

The positive electrode active material containing at least one of Mn and Ni contains an alkali component, such as lithium carbonate ($Li_2CO_3$) or lithium hydroxide (LiOH), which is a residue from the production process. Therefore, when using this positive electrode active material, gel and aggregations normally tend to occur in the slurry composition for the positive electrode of a lithium ion secondary battery due to the alkali component. In the disclosed slurry composition for the positive electrode of a lithium ion secondary battery, however, a predetermined binder is used, and the content of lithium in the binder composition is set within a predetermined range. Hence, the occurrence of gel and aggregations can be suppressed, yielding a slurry composition with good dispersibility.

The blending amount or particle size of the positive electrode active material used herein may be, but is not limited to, the same amount or particle size as the positive electrode active material conventionally used.

<Conductive Material>

The conductive material ensures electrical contact between the positive electrode active materials. The conductive material may be, but is not limited to, any conductive material known in the art. Specific examples of the conductive material include conductive carbon materials, such as acetylene black, Ketjen Black®, furnace black, graphite, carbon fiber, carbon flakes, carbon nanofiber (such as carbon nanotubes, vapor-grown carbon fiber, and the like); fibers of various metals; and foil. Of these materials, acetylene black, Ketjen Black®, or furnace black may preferably be used as the conductive material to improve the electrical contact between the positive electrode active materials as well as to improve the electrical characteristics of the lithium ion secondary battery including the positive electrode for a lithium ion secondary battery formed with the slurry composition for the positive electrode of a lithium ion secondary battery. Acetylene black is particularly preferred.

One kind of these conductive materials may be used alone, or two or more kinds may be used in combination.

The blending amount of the conductive material is preferably 1 part by mass or greater and more preferably 1.2 parts by mass or greater, but preferably 3 parts by mass or less and more preferably 2.8 parts by mass or less, per 100 parts by mass of the positive electrode active material. If the blending amount of the conductive material is excessively small, electrical contact between the positive electrode active materials would not be sufficiently ensured, which consequently fails to provide the lithium ion secondary battery with sufficient electrical characteristics. Conversely, if the blending amount of the conductive material is excessively large, the stability of the slurry composition for the positive electrode of a lithium ion secondary battery would decrease, and the density of the positive electrode mixed material layer in the positive electrode for a lithium ion secondary battery would also decrease, thereby failing to sufficiently increase the capacity of the lithium ion secondary battery.

<Other Components>

The disclosed slurry composition for the positive electrode of a lithium ion secondary battery may further contain, for example, a viscosity modifier, a reinforcing agent, an antioxidant, an additive for electrolysis solution having a function of suppressing decomposition of the electrolysis solution, and the like in addition to the above-described components. These other components may be selected from those that are publicly known.

<TI Value>

The ratio of the viscosity at 6 rpm to the viscosity at 60 rpm as measured with a Brookfield viscometer, i.e. the TI value (viscosity at 6 rpm/viscosity at 60 rpm) of the disclosed slurry composition is preferably 1 or greater, more preferably 1.2 or greater, and even more preferably 1.4 or greater, but is preferably 4 or less, more preferably 3.8 or less, and even more preferably 3.6 or less. Setting the TI value of the slurry composition for the positive electrode of a lithium ion secondary battery to be 1 or greater to 4 or less stabilizes the coating amount of the slurry composition for the positive electrode of a lithium ion secondary battery when forming the positive electrode for a lithium ion secondary battery and allows formation of a uniform positive electrode mixed material layer. As a result, a lithium ion secondary battery with excellent electrical characteristics can be obtained. If the TI value is less than 1, the dilatancy of the slurry composition for the positive electrode of a lithium ion secondary battery increases, and fluidity at the time of coating worsens, thereby making it difficult to stabilize the coating amount. If the TI value exceeds 4, it becomes difficult to coat the slurry composition for the positive electrode of a lithium ion secondary battery onto the substrate of a current collector or the like smoothly.

The "TI value" referred to here can be measured using the measurement method described in the Examples of this disclosure.

To stabilize the coating amount of the slurry composition for the positive electrode of a lithium ion secondary battery when forming the positive electrode for a lithium ion secondary battery, the viscosity at 6 rpm is preferably 1,000 mPa·s or greater, more preferably 1,800 mPa·s or greater, and even more preferably 2,800 mPa·s or greater; but preferably 20,000 mPa·s or less, more preferably 17,000 mPa·s or less, and even more preferably 14,000 mPa·s or less. For the same reason, the viscosity at 60 rpm is preferably 1,000 mPa·s or greater, more preferably 1,500 mPa·s or greater, and even more preferably 2,000 mPa·s or greater; but preferably 5,000 mPa·s or less, more preferably 4,500 mPa·s or less, and even more preferably 4,000 mPa·s or less.

The TI value and viscosity of the slurry composition for the positive electrode of a lithium ion secondary battery can be adjusted by, for example, changing the solid content concentration in the slurry composition for the positive electrode of a lithium ion secondary battery, the blending percentage of each of the above-described compounds, the molecular weight of the polymer used as the binder, or the like. Specifically, for example the TI value increases upon increasing the molecular weight of the polymer used as the binder, whereas the TI value decreases upon increasing the amount of the acid group in the polymer used as the binder.

(Method of Producing a Slurry Composition for the Positive Electrode of a Lithium Ion Secondary Battery)

The disclosed slurry composition for the positive electrode of a lithium ion secondary battery can be prepared by dispersing the above-described components in an organic solvent that serves as a dispersion medium. Specifically, the slurry composition for the positive electrode of a lithium ion secondary battery can be prepared by, for example, preparing a binder composition for the positive electrode of a lithium ion secondary battery that includes a binder and an organic solvent as an organic dispersion medium in advance (process to prepare a binder composition for the positive electrode of a lithium ion secondary battery), then mixing the binder composition for the positive electrode of a lithium ion secondary battery with a positive electrode active material, a conductive material, any other freely selected components, and additional organic dispersion medium (mixing process).

The mixing can be accomplished using a mixer known in the art, such as a ball mill, a sand mill, a bead mill, a pigment disperser, a grinding machine, an ultrasonic disperser, a homogenizer, a planetary mixer, or FILMIX. The same organic dispersion medium that was used to prepare the binder composition for the positive electrode of a lithium ion secondary battery may be used as the additional organic dispersion medium.

In the disclosed method of producing the slurry composition for the positive electrode of a lithium ion secondary battery, the above-described binder composition for the positive electrode of a lithium ion secondary battery may, for example, be prepared as follows.

As described above, the polymer used as the binder is obtained in the form of a water dispersion. Furthermore, 0.6 to 1.5 equivalents of lithium with respect to the acid group of the binder need to be blended into the binder composition for the positive electrode of a lithium ion secondary battery.

Therefore, in the method of preparing a slurry composition for the positive electrode of a lithium ion secondary battery, for example a lithium compound such as lithium hydroxide is added into a water dispersion of the polymer used as the binder with a pH of approximately 3.5 so that the lithium reaches a predetermined equivalent with respect to the acid group, and the pH of the water dispersion is adjusted to be 7.5 or greater. A pH adjusted water dispersion including a polymer that has a weight-average molecular weight of 100,000 to 2,000,000 and contains 10% to 35% by mass of an ethylenically unsaturated monomer unit containing an acid group and including 0.6 to 1.5 equivalents of lithium with respect to the acid group is thus obtained. Note that adjustment of pH may be carried out by using only the lithium compound or may be carried out by using another compound such as sodium hydroxide. Subsequently, an organic dispersion medium is substituted for water in the pH adjusted water dispersion. By thus adding a lithium compound to a water dispersion of the polymer, the lithium compound can be dissolved well, thus allowing easy preparation of the disclosed binder composition, which contains lithium, for the positive electrode of a lithium ion secondary battery and of a slurry composition for the positive electrode of a lithium ion secondary battery that includes the binder composition for the positive electrode of a lithium ion secondary battery.

The substitution of an organic dispersion medium for water may be made by, for example, adding an organic dispersion medium with a higher boiling point than water and then evaporating all of the water and a portion of the organic dispersion medium under reduced pressure. When substituting the organic dispersion medium for water, residual monomer may be removed simultaneously by evaporating the residual monomer along with the water. By removing residual monomer simultaneously with substitution of the organic dispersion medium for water, the slurry composition for the positive electrode of a lithium ion secondary battery can be produced efficiently.

The pH of the pH adjusted water dispersion needs to be 7.5 or greater, is preferably 7.8 or greater, and is more preferably 8 or greater, but is preferably 12 or less. If the pH of the pH adjusted water dispersion is less than 7.5 or greater than 12, aggregations may occur, which may decrease the dispersibility of the slurry composition for the positive electrode of a lithium ion secondary battery.

(Positive Electrode for Lithium Ion Secondary Battery)

The positive electrode for a lithium ion secondary battery may be produced with the disclosed method of producing a positive electrode for a lithium ion secondary battery, using the disclosed slurry composition for the positive electrode of a lithium ion secondary battery.

The positive electrode for a lithium ion secondary battery produced with the disclosed method of producing a positive electrode for a lithium ion secondary battery includes a current collector and a positive electrode mixed material layer formed on the current collector, and the positive electrode mixed material layer includes at least a positive electrode active material, a conductive material, and a binder. The positive electrode active material, conductive material, and binder included in the positive electrode are included in the disclosed slurry composition for the positive electrode of a lithium ion secondary battery. The appropriate proportion of each of these components in the positive electrode is the same as the appropriate proportion of each of these components in the disclosed slurry composition for the positive electrode of a lithium ion secondary battery.

In the positive electrode for a lithium ion secondary battery prepared by the disclosed method of preparing a positive electrode for a lithium ion secondary battery, the positive electrode mixed material layer is formed using the above-described slurry composition for the positive electrode of a lithium ion secondary battery. Therefore, the electrical characteristics of the lithium ion secondary battery can be sufficiently improved.

The disclosed method of producing the positive electrode for a lithium ion secondary battery includes applying the above-described slurry composition for the positive electrode of a lithium ion secondary battery onto a current collector (application step) and drying the slurry composition for the positive electrode of a lithium ion secondary battery applied onto the current collector to form a positive electrode mixed material layer on the current collector (drying step).

<Application Step>

The above-described slurry composition for the positive electrode of a lithium ion secondary battery may be applied onto the current collector with any publicly known method. Specifically, the slurry composition may be applied for example by doctor blading, dip coating, reverse roll coating, direct roll coating, gravure coating, extrusion coating, or brush coating. The slurry composition for the positive electrode of a lithium ion secondary battery may be applied onto one side or both sides of the current collector. The thickness of the slurry coating on the current collector after application yet before drying may be properly determined in accordance with the thickness of the positive electrode mixed material layer to be obtained after drying.

The current collector to be coated with the slurry composition for the positive electrode of a lithium ion secondary battery is made of a material having electrical conductivity and electrochemical durability. Specifically, the current collector may be made of aluminum or aluminum alloy. Aluminum and an aluminum alloy may be used in combination, or a combination of different types of aluminum alloys may be used. Aluminum and aluminum alloy are heat resistant and electrochemically stable and hence are superior materials for the current collector.

<Drying Step>

The slurry composition for the positive electrode of a lithium ion secondary battery applied onto the current collector may be dried by any publicly known method, for example, drying by warm, hot, or low-humidity air; drying in a vacuum; or drying by irradiation of infrared light or electron beams. Drying the slurry composition for the positive electrode of a lithium ion secondary battery on the current collector in this way forms a positive electrode mixed material layer on the current collector to yield a positive electrode for a lithium ion secondary battery that includes the current collector and the positive electrode mixed material layer.

After the drying step, the positive electrode mixed material layer may be further subjected to a pressing treatment, such as mold pressing or roll pressing. The pressing treatment increases the adherence between the positive electrode mixed material layer and the current collector.

Furthermore, when the positive electrode mixed material layer includes a curable polymer, the polymer is preferably cured after forming the positive electrode mixed material layer.

(Lithium Ion Secondary Battery)

The disclosed lithium ion secondary battery includes a positive electrode, a negative electrode, an electrolysis solution, and a separator, and the positive electrode is the positive electrode for a lithium ion secondary battery that is produced by the disclosed method of producing a positive electrode for a lithium ion secondary battery. By using the positive electrode for a lithium ion secondary battery produced with the disclosed method of producing a positive electrode for a lithium ion secondary battery, the disclosed lithium ion secondary battery has excellent electrical characteristics.

<Negative Electrode>

The negative electrode of the lithium ion secondary battery may be any negative electrode known in the art that is used as the negative electrode for a lithium ion secondary battery. Specifically, the negative electrode may for example be a thin sheet of metal lithium or an electrode having a negative electrode mixed material layer formed on a current collector.

The current collector may be made of a metal material such as iron, copper, aluminum, nickel, stainless steel, titan, tantalum, gold, and platinum. The negative electrode mixed material layer may include a negative electrode active material and a binder. Any material, including but not limited to materials known in the art, may be used as the binder.

<Electrolysis Solution>

As the electrolysis solution, an organic electrolysis solution yielded by dissolving a supporting electrolyte into an organic solvent is normally used. A lithium salt, for example, may be used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these, $LiPF_6$, $LiClO_4$, and $CF_3SO_3Li$ are preferable in that they easily dissolve in the solvent and exhibit a high degree of dissociation, with $LiPF_6$ being particularly preferable. One kind of electrolyte may be used alone, or two or more kinds may be used in combination at any ratio. Normally, the lithium ion conductivity tends to increase as a supporting electrolyte with a higher degree of dissociation is used. Therefore, the lithium ion conductivity can be adjusted by the type of supporting electrolyte.

Any organic solvent that can dissolve the supporting electrolyte may be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Among these solvents, carbonates are preferable for their high dielectric constant and broad stable potential region, and a mixture of ethylene carbonate and ethyl methyl carbonate is more preferable. Normally, as the viscosity of the solvent being used is lower, the lithium ion conductivity tends to increase. Hence, the lithium ion conductivity can be adjusted by the type of solvent.

The concentration of the electrolyte in the electrolysis solution can be adjusted as needed. For example, the concentration is preferably 0.5% to 15% by mass, more preferably 2% to 13% by mass, and even more preferably 5% to 10% by mass. Any additive known in the art may be added to the electrolysis solution, such as fluoroethylene carbonate or ethyl methyl sulfone.

<Separator>

Examples of the separator that may be used in the disclosed embodiments include those described in JP 2012-204303 A. Of these separators, a fine porous membrane made of polyolefinic (i.e., polyethylene, polypropylene, polybutene, and polyvinyl chloride) resin is preferred, because such a membrane can reduce the total thickness of the separator, which increases the ratio of the electrode active material in the secondary battery, consequently increasing the capacity per volume.

<Method of Producing Lithium Ion Secondary Battery>

The disclosed lithium ion secondary battery is produced for example by layering a positive electrode and a negative electrode by interposing a separator therebetween, rolling or folding the resulting laminate as necessary in accordance with the battery shape, placing it in a battery container, filling the battery container with an electrolysis solution, and sealing the container. To prevent pressure increase inside the lithium ion secondary battery and occurrence of overcharge/overdischarge and the like, the lithium ion secondary battery may include an overcurrent preventing device such as a fuse and a PTC device, expanded metal, and a lead plate, as necessary. The shape of the secondary battery may be a coin type, button type, sheet type, cylinder type, prism type, flat type, or the like.

EXAMPLES

Hereinafter, the disclosed products and method will be described with reference to Examples; however, the disclosure is not limited to those demonstrated in the Examples. In the following, "%" and "parts" used in expressing quantities are by mass, unless otherwise specified.

In the Examples and Comparative Examples, the weight-average molecular weight and degree of swelling in electrolysis solution of the binder, the TI value and dispersibility of the slurry composition for the positive electrode of a lithium ion secondary battery, and the initial capacity, rate characteristics, and cycle characteristics of the lithium ion secondary battery were evaluated with the following methods.

<Weight-Average Molecular Weight>

The weight-average molecular weight of the polymer (binder) included in the binder composition for the positive electrode of a lithium ion secondary battery was measured by gel permeation chromatography (GPC) under the following measurement conditions, using a 10 mM concentration of LiBr-NMP solution.

Separation column: Shodex KD-806M (manufactured by Showa Denko K.K.)

Detector: Differential refractive index detector RID-10A (manufactured by Shimadzu Corporation)

Flow rate of eluent: 0.3 mL/min

Column temperature: 40° C.

Reference polymer: TSK reference polystyrene (manufactured by Tosoh Corporation)

<Degree of Swelling in Electrolysis Solution>

A polymer film was produced by pouring an N-methylpyrrolidone (NMP) solution (concentration 8% by mass) of the binder into a Teflon petri dish and drying to yield a thickness after drying of 100 μm. A circular sample with a diameter of 16 mm was cut out from the resulting polymer film, and the weight was measured (this weight being labeled "A"). Next, a non-aqueous electrolysis solution was prepared (composition: concentration 1.0 M of $LiPF_6$ solution (the solvent being a mixture yielded by adding 5% by mass of fluoroethylene carbonate to a mixed solvent of ethylene carbonate/ethyl methyl carbonate in a 3/7 weight ratio, with the addition of 2% by volume of vinylene carbonate as additive agent)). The cut-out circular sample was immersed in 20 g of this non-aqueous electrolysis solution for 72 hours at 60° C. Subsequently, the swollen circular sample was removed, and the weight was measured after lightly wiping off the non-aqueous electrolysis solution on the surface (this weight being labeled "B"). The degree of swelling in electrolysis solution (B/A) was calculated from these measured values. A larger value indicates a greater tendency to swell in electrolysis solution and a greater amount of deformation.

<TI Value>

Using a Brookfield viscometer (RB-80L, manufactured by Toki Sangyo), the viscosity $\eta_0$ at 60 rpm and the viscosity $\eta_1$ at 6 rpm were measured for the prepared slurry composition for the positive electrode of a lithium ion secondary battery. The TI value ($\eta_1/\eta_0$) was then calculated. The viscosity measurement temperature of the slurry composition for the positive electrode of a lithium ion secondary battery was 25° C.

<Dispersibility>

After adding 1 g of the prepared slurry composition for the positive electrode of a lithium ion secondary battery dropwise to the groove at the deepest side of a grind gauge (prescribed by JIS K5101), a scraper was swept from the deep side towards the 0 μm depth side, and the slurry film that was formed by being scraped was confirmed visually. When the occurrence of a linear or granular anomalous pattern was confirmed on the slurry film, for example due to aggregations with poor dispersibility, then the calibration at the position where three or more lines measuring 1 cm or longer occurred was read in the case of linear marks, and the calibration at the position where 5 to 10 spots occurred within a 3 mm wide band was read in the case of granular marks. Using the calibration that was read, the dispersibility of the slurry composition for the positive electrode of a lithium ion secondary battery was evaluated based on the criteria below. A lower numerical value of the calibration indicates better dispersibility of the slurry composition for the positive electrode of a lithium ion secondary battery.

A: less than 25 μm

B: 25 μm or greater to less than 50 μm

C: 50 μm or greater to less than 75 μm

D: 75 μm or greater

<Initial Capacity>

The prepared pouch-type lithium ion secondary battery was charged with constant current under a temperature environment of 25° C. at a current of 140 mA until the battery voltage reached 4.2 V and then charged with constant voltage at a voltage of 4.2 V until the charging current reached 14 mA. Next, the battery was discharged with constant current at a current of 140 mA until the battery voltage reached 3 V. The result was treated as the initial capacity. The initial capacity was evaluated based on the criteria below.

A: 700 mAh or greater

B: 697 mAh or greater to less than 700 mAh

C: 694 mAh or greater to less than 697 mAh

D: Less than 694 mAh

<Rate Characteristics>

On 10 cells of the prepared pouch-type lithium ion secondary battery, a charge/discharge cycle was performed at a temperature of 25° C. by charging at a constant current of 0.2 C to 4.2 V and discharging at a constant current of 0.2 C to 3.0 V, and a charge/discharge cycle was performed at a temperature of 25° C. by charging at a constant current of 0.2 C to 4.2 V and discharging at a constant current of 1.0 C to 3.0 V. The ratio of the discharge capacity at 1.0 C to the discharge capacity at 0.2 C calculated as a percentage ((discharge capacity at 1.0 C)/(discharge capacity at 0.2 C)×100%) was treated as the charge/discharge rate characteristics, and the rate characteristics were evaluated based on the criteria below. A larger value for the charge/discharge rate characteristics indicates smaller internal resistance and the ability to charge/discharge at high-speed.

A: Charge/discharge rate characteristics of 80% or greater

B: Charge/discharge rate characteristics of 75% or greater to less than 80%

C: Charge/discharge rate characteristics of 70% or greater to less than 75%

D: Charge/discharge rate characteristics of less than 70%

<Cycle Characteristics>

On 10 cells of the prepared pouch-type lithium ion secondary battery, charging/discharging at a temperature of 60° C. by charging at a constant current of 0.2 C to 4.2 V and discharging at a constant current of 0.2 C to 3.0 V was repeated 50 times (50 cycles), and the discharge capacity was measured. With the average value for the 10 cells as the measurement value, the ratio of the discharge capacity after 50 cycles to the discharge capacity after 5 cycles calculated as a percentage ((discharge capacity after 50 cycles)/(discharge capacity after 5 cycles)×100%) was treated as the charge/discharge capacity retention, and the cycle characteristics were evaluated based on the criteria below. A higher value for the charge/discharge capacity retention indicates better high-temperature cycle characteristics.

A: Charge/discharge capacity retention of 80% or greater

B: Charge/discharge capacity retention of 70% or greater to less than 80%

C: Charge/discharge capacity retention of 60% or greater to less than 70%

D: Charge/discharge capacity retention of less than 60%

Example 1

<Preparation of Binder Composition for the Positive Electrode of a Lithium Ion Secondary Battery>

The following were placed in an autoclave equipped with a stirrer and thoroughly stirred: 164 parts by mass of deionized water, 68 parts by mass of 2-ethylhexyl acrylate (2EHA) as a (meth)acrylate monomer, 16 parts by mass of methacrylic acid (MAA) as an ethylenically unsaturated monomer unit containing a carboxylic acid group, 1 part by mass of 2-acrylamide-2-methylpropane sulfonic acid (AMPS) as an ethylenically unsaturated monomer containing a sulfonate group, 15 parts by mass of acrylonitrile (AN) as an α,β-unsaturated nitrile monomer, 0.3 parts of potassium persulfate as a polymerization initiator, 1.6 parts of sodium lauryl sulfate as an emulsifier, and 0.05 parts of t-dodecyl mercaptan as a molecular weight modifier. The result was then polymerized by heating at 70° C. for 3 hours and then at 80° C. for 2 hours to yield a water dispersion of an acrylic polymer containing an acid group (pH: 3.5). The polymerization conversion rate calculated from the solid content concentration was 96%.

Next, 1.6 parts of 4% lithium hydroxide aqueous solution in terms of solid content were added to 100 parts (in terms of solid content) of this pH 3.5 water dispersion of an acrylic polymer containing an acid group so that the amount of lithium with respect to the acid group in the water dispersion became 0.9 equivalents, yielding a pH of 8.5. Subsequently, 500 parts of N-methylpyrrolidone were added, and under reduced pressure, the water and all of the residual monomer were evaporated and 81 parts of the N-methylpyrrolidone were evaporated, yielding a binder composition A for the positive electrode of a lithium ion secondary battery composed of an N-methylpyrrolidone solution (concentration: 8% by mass) of an acrylic polymer containing an acid group.

Using the resulting binder composition A for the positive electrode of a lithium ion secondary battery, the weight-average molecular weight and the degree of swelling in electrolysis solution of the binder were measured. The results are shown in Table 1.

<Preparation of Slurry Composition for Positive Electrode of Lithium Ion Secondary Battery>

Next, 100 parts lithium nickel composite oxide (NCA-02-ST-5 produced by Todakogyo Corp) as a positive electrode active material, 2.0 parts of acetylene black (AB35, Denka Black in powder form, produced by Denki Kagaku Kogyo K.K.) as a conductive material, 1.2 parts of the binder composition A for the positive electrode of a lithium ion secondary battery (in terms of solid content), and an appropriate amount of N-methylpyrrolidone were mixed in a planetary mixer to prepare a slurry composition A for the positive electrode of a lithium ion secondary battery.

Using the resulting slurry composition A for the positive electrode of a lithium ion secondary battery, the TI value and the dispersibility of the slurry composition were evaluated. The results are shown in Table 1.

<Production of Positive Electrode for Lithium Ion Secondary Battery>

An aluminum foil with a thickness of 15 μm was prepared as a current collector. The slurry composition A for the positive electrode of a lithium ion secondary battery was applied to both sides of the aluminum foil so that the coating amount after drying would be 20 $mg/cm^2$, and the slurry composition A was then dried for 20 minutes at 60° C. and for 20 minutes at 120° C. Subsequently, the result was heat treated at 150° C. for 2 hours to yield a web of positive electrode. This web of positive electrode was then rolled by roll pressing to produce a positive electrode in the form of a sheet composed of aluminum foil and a positive electrode mixed material layer with a density of 3.7 $g/cm^3$. The positive electrode in the form of a sheet was cut to a width of 4.8 mm and length of 50 cm to yield a positive electrode for a lithium ion secondary battery.

<Production of Negative Electrode for Lithium Ion Secondary Battery>

A mixture of 90 parts of spherical artificial graphite (volume average particle size: 12 μm) and 10 parts of $SiO_X$ (volume average particle size: 10 μm) as a negative electrode active material, 1 part of styrene butadiene polymer as a binder, 1 part of carboxymethyl cellulose as a thickener, and an appropriate amount of water as a dispersion medium were mixed in a planetary mixer to prepare a slurry composition for a negative electrode of a lithium ion secondary battery.

Next, copper foil with a thickness of 15 μm was prepared as a current collector. The slurry composition for a negative electrode of a lithium ion secondary battery produced as above was applied to both sides of the copper foil so that the coating amount after drying would be 10 mg/$cm^2$, and the slurry composition was then dried for 20 min at 60° C. and for 20 min at 120° C. Subsequently, the result was heat treated at 150° C. for 2 hours to yield a web of negative electrode. This web of negative electrode was then rolled by roll pressing to produce a negative electrode in the form of a sheet composed of copper foil and a negative electrode mixed material layer with a density of 1.8 g/$cm^3$. The negative electrode in the form of a sheet was cut to a width of 5.0 mm and length of 52 cm to yield a negative electrode for a lithium ion secondary battery.

<Production of Lithium Ion Secondary Battery>

The positive electrode for a lithium ion secondary battery and the negative electrode for a lithium ion secondary battery that were produced as described above were wound around a 20 mm diameter core with a separator therebetween (fine porous membrane of polypropylene with a thickness of 20 μm) to yield a wound body. The resulting wound body was compressed in one direction at a rate of 10 mm/s until reaching a thickness of 4.5 mm. The compressed wound body had an elliptical shape in plan view, and the ratio of the major axis to the minor axis (major axis/minor axis) was 7.7.

A non-aqueous electrolysis solution was prepared (composition: concentration 1.0 M of $LiPF_6$ solution (the solvent being a mixture yielded by adding 5% by mass of fluoroethylene carbonate to a mixed solvent of ethylene carbonate/ethyl methyl carbonate in a 3/7 weight ratio, with the addition of 2% by volume of vinylene carbonate as additive agent)).

The compressed wound body was housed in a predetermined aluminum laminate case along with 3.2 g of non-aqueous electrolysis solution. After connecting a nickel lead wire connected to the negative electrode for a lithium ion secondary battery and an aluminum lead wire connected to the positive electrode for a lithium ion secondary battery to predetermined locations, the opening of the case was thermally sealed to yield a lithium ion secondary battery. This lithium ion secondary battery had a pouch-shape with a width of 35 mm, height of 48 mm, and thickness of 5 mm, and the nominal capacity of the battery was 700 mAh. The initial capacity, rate characteristics, and cycle characteristics were evaluated for the resulting lithium ion secondary battery. The results are shown in Table 1.

Examples 2-5

Other than changing the blending amounts of methacrylic acid and 2-acrylamide-2-methylpropane sulfonic acid as shown in Table 1 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Examples 6-8

Other than changing the added amount of lithium hydroxide aqueous solution and changing the amount of lithium with respect to the acid group and the pH as shown in Table 1 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Examples 9-10

Other than changing the blending amount of 2-ethylhexyl acrylate as shown in Table 1 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Examples 11-12

Other than changing the blending amount of acrylonitrile as shown in Table 1 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Example 13

Other than changing the blending amount of t-dodecyl mercaptan to 0.1 parts when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Example 14

Other than not adding a molecular weight modifier when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Example 15

Other than using 100 parts of lithium cobalt oxide, i.e. $LiCoO_2$, as the positive electrode active material, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 1.

Comparative Examples 1-2

Other than changing the blending amounts of methacrylic acid and 2-acrylamide-2-methylpropane sulfonic acid as shown in Table 2 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 2.

Comparative Examples 3-4

Other than changing the added amount of lithium hydroxide aqueous solution and changing the amount of lithium with respect to the acid group and the pH as shown in Table 2 when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 2.

Comparative Example 5

Other than changing the blending amount of t-dodecyl mercaptan to 0.3 parts when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 2.

Comparative Example 6

Other than using 0.03 parts of allyl methacrylate as a molecular weight modifier when preparing the binder composition for the positive electrode of a lithium ion secondary battery, the procedure of Example 1 was followed to produce a binder composition for the positive electrode of a lithium ion secondary battery, a slurry composition for the positive electrode of a lithium ion secondary battery, a positive electrode for a lithium ion secondary battery, a negative electrode for a lithium ion secondary battery, and a lithium ion secondary battery, and evaluations were made. The results are shown in Table 2.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Positive electrode active material | | lithium nickel composite oxide [parts by mass] | 100 | 100 | 100 | 100 | 100 | 100 | 100 | 100 | 100 |
| | | lithium cobalt oxide ($LiCoO_2$) [parts by mass] | — | — | — | — | — | — | — | — | — |
| Conductive material | | acetylene black [parts by mass] | 2 | 2 | 2 | 2 | 2 | 2 | 2 | 2 | 2 |
| Binder | Monomer composition | methacrylic acid (MAA) [parts by mass]/ [% by mass] *1 | 16/16 | 11/11.6 | 23.5/ 21.8 | 17/17 | 14.4/ 14.4 | 16/16 | 16/16 | 16/16 | 16/18.4 |
| | | 2-acrylamide-2-methylpropane sulfonic acid (AMPS) [parts by mass]/ [% by mass] *1 | 1/1 | 0.7/0.7 | 1.5/1.4 | — | 2.6/2.6 | 1/1 | 1/1 | 1/1 | 1/1.1 |
| | | 2-ethylhexyl acrylate [parts by mass]/ [% by mass] *2 | 68/68 | 68/71.8 | 68/63 | 68/68 | 68/68 | 68/68 | 68/68 | 68/68 | 55/63.2 |
| | | acrylonitrile [parts by mass]/ [% by mass] *3 | 15/15 | 15/15.8 | 15/13.9 | 15/15 | 15/15 | 15/15 | 15/15 | 15/15 | 15/17.2 |
| | | AMPS/(MAA + AMPS) [% by mass] | 6 | 6 | 6 | 0 | 15 | 6 | 6 | 6 | 6 |

TABLE 1-continued

| | | | | | | | | | |
|---|---|---|---|---|---|---|---|---|---|
| Ratio of lithium ion equivalents to acid group [−] | 0.9 | 0.9 | 0.9 | 0.9 | 0.9 | 0.7 | 1.1 | 1.3 | 0.9 |
| pH of pH adjusted water dispersion [−] | 8.5 | 8.5 | 8.5 | 8.5 | 8.5 | 7.8 | 11 | 12 | 8.5 |
| Molecular weight [−] | 1 million | 1 million | 1 million | 1 million | 1 million | 1 million | 1 million | 1 million | 1 million |
| Degree of swelling in electrolysis solution [−] | 1.5 | 2 | 1.2 | 1.6 | 1.8 | 2.5 | 1.2 | 1.1 | 1.4 |
| Blending amount [parts by mass] | 1.2 | 1.2 | 1.2 | 1.2 | 1.2 | 1.2 | 1.2 | 1.2 | 1.2 |
| Slurry viscosity (6 rpm) [mPa · s] | 7400 | 8900 | 5000 | 8000 | 6200 | 8300 | 9300 | 11500 | 7200 |
| Slurry viscosity (60 rpm) [mPa · s] | 2400 | 2700 | 2000 | 2500 | 2300 | 2600 | 2800 | 2900 | 2400 |
| TI value [−] | 3 | 3.3 | 2.5 | 3.6 | 2.7 | 3.2 | 3.3 | 3.9 | 3 |
| Dispersibility | A | B | B | A | B | B | B | B | A |
| Initial capacity | A | B | B | B | B | B | B | C | A |
| Rate characteristics | A | B | B | B | B | B | B | C | A |
| Cycle characteristics | A | B | B | A | B | B | C | C | C |

| | | | Example 10 | Example 11 | Example 12 | Example 13 | Example 14 | Example 15 |
|---|---|---|---|---|---|---|---|---|
| Positive electrode active material | | lithium nickel composite oxide [parts by mass] | 100 | 100 | 100 | 100 | 100 | — |
| | | lithium cobalt oxide ($LiCoO_2$) [parts by mass] | — | — | — | — | — | 100 |
| Conductive material | | acetylene black [parts by mass] | 2 | 2 | 2 | 2 | 2 | 2 |
| Binder | Monomer composition | methacrylic acid (MAA) [parts by mass]/[% by mass] *1 | 16/14.3 | 16/17.8 | 16/14.5 | 16/16 | 16/16 | 16/16 |
| | | 2-acrylamide-2-methylpropane sulfonic acid (AMPS) [parts by mass]/[% by mass] *1 | 1/0.9 | 1/1.1 | 1/0.9 | 1/1 | 1/1 | 1/1 |
| | | 2-ethylhexyl acrylate [parts by mass]/[% by mass]* 2 | 80/71.4 | 68/75.6 | 68/61.8 | 68/68 | 68/68 | 68/68 |
| | | acrylonitrile [parts by mass]/[% by mass] *3 | 15/13.4 | 5/5.6 | 25/22.7 | 15/15 | 15/15 | 15/15 |
| | | AMPS/(MAA + AMPS) [% by mass] | 6 | 6 | 6 | 6 | 6 | 6 |
| | Ratio of lithium ion equivalents to acid group [−] | | 0.9 | 0.9 | 0.9 | 0.9 | 0.9 | 0.9 |
| | pH of pH adjusted water dispersion [−] | | 8.5 | 8.5 | 8.5 | 8.5 | 8.5 | 8.5 |
| | Molecular weight [−] | | 1 million | 1 million | 1 million | 300,000 | 1.5 million | 1 million |
| | Degree of swelling in electrolysis solution [−] | | 1.9 | 1.2 | 4.5 | 2.1 | 1.3 | 1.5 |
| | Blending amount [parts by mass] | | 1.2 | 1.2 | 1.2 | 1.2 | 1.2 | 1.2 |
| Slurry viscosity (6 rpm) [mPa · s] | | | 8300 | 7800 | 7300 | 4600 | 9500 | 7000 |
| Slurry viscosity (60 rpm) [mPa · s] | | | 2500 | 2600 | 2500 | 2300 | 2700 | 2400 |
| TI value [−] | | | 3.3 | 3 | 3.1 | 2 | 3.5 | 2.9 |
| Dispersibility | | | B | B | B | B | A | A |
| Initial capacity | | | B | A | A | B | B | A |
| Rate characteristics | | | B | A | A | B | B | A |
| Cycle characteristics | | | B | C | C | C | A | A |

*1 Ethylenically unsaturated monomer containing acid group

*2 (Meth)acrylate monomer

*3 α,β-unsaturated nitrile monomer

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Positive electrode active material | | lithium nickel composite oxide [parts by mass] | 100 | 100 | 100 | 100 | 100 | 100 |
| | | lithium cobalt oxide ($LiCoO_2$) [parts by mass] | — | — | — | — | — | — |
| Conductive material | | acetylene black [parts by mass] | 2 | 2 | 2 | 2 | 2 | 2 |
| Binder | Monomer composition | methacrylic acid (MAA) [parts by mass]/ [% by mass] *1 | 6.6/7.3 | 47/35.3 | 16/16 | 16/16 | 16/16 | 16/16 |
| | | 2-acrylamide-2-methyl-propane sulfonic acid (AMPS) [parts by mass/ [% by mass] *1 | 0.4/0.4 | 3/2.3 | 1/1 | 1/1 | 1/1 | 1/1 |
| | | 2-ethylhexyl acrylate [parts by mass]/ [% by mass] *2 | 68/75.6 | 68/51.1 | 68/68 | 68/68 | 68/68 | 68/68 |
| | | acrylonitrile [parts by mass]/ [% by mass] *3 | 15/16.7 | 15/11.3 | 15/15 | 15/15 | 15/15 | 15/15 |
| | | AMPS/(MAA + AMPS) [% by mass] | 6 | 6 | 6 | 6 | 6 | 6 |
| | Ratio of lithium ion equivalents to acid group [−] | | 0.9 | 0.9 | 0.5 | 1.8 | 0.9 | 0.9 |
| | pH of pH adjusted water dispersion [−] | | 8.5 | 8.5 | 6 | 12 | 8.5 | 8.5 |
| | Molecular weight [-] | | 1 million | 1 million | 1 million | 1 million | 50,000 | 2.3 million |
| | Degree of swelling in electrolysis solution [−] | | 2.7 | 1.3 | 2.4 | 1.1 | 3.4 | 1.5 |
| | Blending amount [parts by mass] | | 1.2 | 1.2 | 1.2 | 1.2 | 1.2 | 1.2 |
| Slurry viscosity (6 rpm) [mPa · s] | | | 13000 | 2300 | 11500 | 5200 | 3500 | 18000 |
| Slurry viscosity (60 rpm) [mPa · s] | | | 2800 | 2900 | 2700 | 6500 | 2000 | 3000 |
| TI value [−] | | | 4.5 | 0.8 | 4.2 | 4.4 | 1.5 | 6 |
| Dispersibility | | | D | D | D | D | D | C |
| Initial capacity | | | C | C | C | D | C | D |
| Rate characteristics | | | C | C | C | D | C | D |
| Cycle characteristics | | | D | D | D | D | D | C |

*1 Ethylenically unsaturated monomer containing acid group
*2 (Meth)acrylate monomer
*3 $\alpha,\beta$-unsaturated nitrile monomer Table 1 shows that slurry compositions for the positive electrode of a lithium ion secondary battery using a binder composition for the positive electrode of a lithium ion secondary battery such that the binder composition includes (i) a binder having a predetermined weight-average molecular weight and containing a predetermined amount of an ethylenically unsaturated monomer unit containing an acid group and (ii) a predetermined amount of lithium have excellent dispersibility, and lithium ion secondary batteries prepared using these slurry compositions for the positive electrode of a lithium ion secondary battery have excellent electrical characteristics. By contrast, Table 2 shows that slurry compositions for the positive electrode of a lithium ion secondary battery using a binder composition for the positive electrode of a lithium ion secondary battery such that the binder composition includes a binder not having a predetermined weight-average molecular weight or a binder not containing a predetermined amount of an ethylenically unsaturated monomer unit containing an acid group and slurry compositions for the positive electrode of a lithium ion secondary battery using a binder composition for the positive electrode of a lithium ion secondary battery such that the binder composition does not contain a predetermined amount of lithium have poor dispersibility, and lithium ion secondary batteries produced using these slurry compositions for the positive electrode of a lithium ion secondary battery have inferior electrical characteristics.

Furthermore, Examples 1-5 and 9-12 in Table 1 show that by changing the proportion of the monomer unit included in the binder, the dispersibility of the slurry composition for the positive electrode of a lithium ion secondary battery and the electrical characteristics of the lithium ion secondary battery can be further improved.

Example 1 and Examples 6-8 in Table 1 also show that by changing the amount of lithium included in the binder composition for the positive electrode of a lithium ion secondary battery, the dispersibility of the slurry composition for the positive electrode of a lithium ion secondary battery and the electrical characteristics of the lithium ion secondary battery can be further improved.

Example 1 and Examples 13-14 in Table 1 further show that by changing the molecular weight of the binder, the dispersibility of the slurry composition for the positive electrode of a lithium ion secondary battery and the electrical characteristics of the lithium ion secondary battery can be further improved.

INDUSTRIAL APPLICABILITY

This disclosure provides a binder composition for the positive electrode of a lithium ion secondary battery that can suppress the occurrence of aggregations and gel and a slurry composition for the positive electrode of a lithium ion secondary battery that has excellent dispersibility and can sufficiently improve the electrical characteristics of the lithium ion secondary battery. Furthermore, this disclosure provides a method of producing a positive electrode for a lithium ion secondary battery that can sufficiently improve the electrical characteristics of the lithium ion secondary battery. This disclosure also provides a lithium ion secondary battery with excellent electrical characteristics.

The invention claimed is:

1. A binder composition for the positive electrode of a lithium ion secondary battery, comprising:

a binder and an organic dispersion medium, wherein a weight-average molecular weight of the binder is from 100,000 to 2,000,000, and wherein the binder contains 10% to 35% by mass of an ethylenically unsaturated monomer unit containing an acid group; and 0.6 to 1.5 equivalents of lithium with respect to the acid group.

2. A slurry composition for the positive electrode of a lithium ion secondary battery, the slurry composition comprising: the binder composition for the positive electrode of a lithium ion secondary battery of claim 1; a positive electrode active material; and a conductive material.

3. The slurry composition for the positive electrode of a lithium ion secondary battery of claim 2, wherein a TI value (ratio of viscosity at 6 rpm to viscosity at 60 rpm) measured with a Brookfield viscometer is from 1 to 4.

4. The slurry composition for the positive electrode of a lithium ion secondary battery of claim 2, wherein the binder contains 50% to 85% by mass of a (meth)acrylate monomer unit.

5. The slurry composition for the positive electrode of a lithium ion secondary battery of claim 2, wherein the acid group includes at least one of a carboxylic acid group and a sulfonate group.

6. The slurry composition for the positive electrode of a lithium ion secondary battery of claim 2, wherein a degree of swelling in electrolysis solution of the binder is 1 to 5 times.

7. The slurry composition for the positive electrode of a lithium ion secondary battery of claim 2, wherein the positive electrode active material is a lithium nickel composite oxide.

8. A method of producing a positive electrode for a lithium ion secondary battery, the method comprising: forming a positive electrode mixed material layer on a current collector by applying the slurry composition for the positive electrode of a lithium ion secondary battery of claim 2 on the current collector and drying the slurry composition.

9. A lithium ion secondary battery comprising: a positive electrode for a lithium ion secondary battery obtained by the method of claim 8; a negative electrode; an electrolysis solution; and a separator.

10. The binder composition for the positive electrode of a lithium ion secondary battery of claim 1, wherein a content percentage of the ethylenically unsaturated monomer unit containing an acid group is 15% by mass or greater.

11. The binder composition for the positive electrode of a lithium ion secondary battery of claim 10, wherein the binder further contains a (meth)acrylate monomer unit and an α,β-unsaturated nitrile monomer unit, and a content percentage of the α,β-unsaturated nitrile monomer unit is 5% to 30% by mass.

* * * * *